US008909434B2

(12) United States Patent
Anders et al.

(10) Patent No.: US 8,909,434 B2
(45) Date of Patent: Dec. 9, 2014

(54) SYSTEM AND METHOD FOR CONTROLLING POWER IN MACHINE HAVING ELECTRIC AND/OR HYDRAULIC DEVICES

(75) Inventors: Jonathan W. Anders, Peoria, IL (US); Corey L. Gorman, Kobe (JP); John J. Bernardi, Chillicothe, IL (US)

(73) Assignee: Caterpillar, Inc., Peoria, IL (US)

( * ) Notice: Subject to any disclaimer, the term of this patent is extended or adjusted under 35 U.S.C. 154(b) by 801 days.

(21) Appl. No.: 13/172,319

(22) Filed: Jun. 29, 2011

(65) Prior Publication Data
US 2013/0004281 A1 Jan. 3, 2013

(51) Int. Cl.
*G06F 19/00* (2011.01)
*E02F 9/20* (2006.01)
*E02F 9/22* (2006.01)
*B60W 10/30* (2006.01)
*B60K 6/12* (2006.01)
*B60W 20/00* (2006.01)
*B60L 11/02* (2006.01)
*B60K 6/48* (2007.10)

(52) U.S. Cl.
CPC ........... *E02F 9/2095* (2013.01); *Y02T 10/6282* (2013.01); *E02F 9/2217* (2013.01); *B60W 10/30* (2013.01); *Y02T 10/6221* (2013.01); *B60W 2300/17* (2013.01); *Y02T 10/7077* (2013.01); *E02F 9/2075* (2013.01); *B60K 6/12* (2013.01); *B60W 20/00* (2013.01); *B60L 2200/40* (2013.01); *B60L 11/02* (2013.01); *E02F 9/2091* (2013.01); *Y02T 10/6208* (2013.01); *B60K 6/48* (2013.01)
USPC .......................................................... 701/50

(58) Field of Classification Search
CPC ......... E02F 9/20; E02F 9/2075; E02F 9/2217; E02F 9/2095; E02F 9/22; Y02T 10/7077; B60K 6/00; B60K 6/12; B60K 6/48; B60W 10/30; B60W 20/00
USPC .......................................................... 701/50
See application file for complete search history.

(56) References Cited

U.S. PATENT DOCUMENTS 6,666,022 B1 12/2003 Yoshimatsu et al.
6,820,356 B2 11/2004 Naruse et al.
(Continued)

FOREIGN PATENT DOCUMENTS

| DE | 202009004071 | 8/2010 |
| JP | 2005-163605 A | 6/2005 |
| JP | 2009-127296 A | 6/2009 |
| WO | WO 2008/128416 A1 | 10/2008 |

*Primary Examiner* — Mary Cheung
*Assistant Examiner* — Anne Mazzara
(74) *Attorney, Agent, or Firm* — Finnegan, Henderson, Farabow, Garrett & Dunner LLP

(57) ABSTRACT

Disclosed is a system for controlling power in a machine. The system includes a controller configured to determine a level of power to be provided or consumed by at least one of an electric device and a hydraulic device based on request signals, operation signals, and a control strategy for controlling at least one of electric power and hydraulic power for the machine, and provide control signals for controlling operation of the at least one device. The control strategy includes a subsystem control and a supervisory control. The subsystem control includes at least one of electric and hydraulic subsystem controls for controlling operation of at least one of an electric device and a hydraulic device. The subsystem control is configured to provide range signals indicative of at least one of a range of acceptable electric power levels and a range of acceptable hydraulic power levels, and the supervisory control is configured to determine the control signals.

29 Claims, 4 Drawing Sheets

(56) References Cited

U.S. PATENT DOCUMENTS

| | | |
|---|---|---|
| 7,069,673 B2 | 7/2006 | Kagoshima et al. |
| 7,206,687 B1 | 4/2007 | Huseman |
| 7,669,413 B2 | 3/2010 | Komiyama et al. |
| 7,751,954 B2 | 7/2010 | Matsuda et al. |
| 2005/0036894 A1 | 2/2005 | Oguri |
| 2006/0229786 A1 | 10/2006 | Sawada |
| 2007/0080236 A1 | 4/2007 | Betz et al. |
| 2008/0082240 A1 | 4/2008 | Kagoshima et al. |
| 2009/0112415 A1 | 4/2009 | Hendryx |
| 2009/0251090 A1 | 10/2009 | Tanaka et al. |
| 2009/0301075 A1 | 12/2009 | Morinaga et al. |
| 2010/0051367 A1 | 3/2010 | Yamada et al. |
| 2010/0076662 A1 | 3/2010 | Sheidler et al. |
| 2010/0187030 A1 | 7/2010 | Gearhart |

SYSTEM AND METHOD FOR CONTROLLING POWER IN MACHINE HAVING ELECTRIC AND/OR HYDRAULIC DEVICES

TECHNICAL FIELD

The present disclosure relates to a system and method for controlling power in a machine having electric and/or hydraulic devices, and more particularly, to a system and method for controlling electric and/or hydraulic devices configured to provide and consume power.

BACKGROUND

Some conventional machines have a hydraulic power source for operating hydraulic actuators. For example, such a machine might typically include an internal combustion engine for driving one or more hydraulic pumps, which, in turn, supply power to one or more hydraulic actuators for performing work. One example of such a machine is a hydraulic excavator. A hydraulic excavator may typically include one or more hydraulic pumps, which provide hydraulic power in the form of pressurized fluid flow to one or more hydraulic motors and hydraulic cylinders for operation of a boom, stick, and digging implement. In such a machine, the hydraulic motors may be used to rotate a cab relative to a chassis on which the cab is mounted and drive grounding engaging wheels or tracks for movement of the machine. Hydraulic power provided to the hydraulic actuators may be used to raise and lower the boom and manipulate the stick and the digging implement in order to perform digging and/or loading operations.

To increase the efficiency and/or reduce undesirable emissions resulting from operation of the internal combustion engine, efforts have been made to recapture some of the energy typically lost during operation of such a machine. For example, energy may be recaptured in the form of stored electric and hydraulic energy for use by electric and hydraulic devices. Thus, it may be desirable to perform some working functions in a machine with both stored hydraulic energy and stored electric energy by use of both electric and hydraulic devices. However, in such a machine it may be difficult to control the supply of electric and hydraulic power to the electric and hydraulic devices in a manner that results in desirable performance and/or efficiency. Therefore, it may be desirable to provide a system and method for controlling power in a machine having both electric and hydraulic devices in a manner that results in the machine having the desired performance and/or efficiency.

A hybrid construction machine is disclosed U.S. Pat. No. 7,669,413 B2 to Komiyama et al. ("the '413 patent"). In particular, the '413 patent discloses a hybrid excavator including a hydraulic pump, a generator motor connected in parallel to an output shaft of an engine, and a rotation motor driven by a battery. The generator motor assists the engine by performing a motor function. Power consumption of each of the hydraulic pump and the rotation motor is detected, and the output of the hydraulic pump and the rotation motor is controlled such that the sum of the detected power consumption does not exceed a maximum supply power set as the sum of power that can be supplied to the hydraulic pump and the rotation motor.

Although the machine disclosed in the '413 patent includes both electric and hydraulic devices, the machine disclosed in the '413 patent may still fail to control the electric and hydraulic devices in the machine in a manner providing desirable machine performance and efficiency. Therefore, it may be desirable to provide a system and method for controlling power in a machine having both electric and hydraulic devices in a manner that results in the machine having the desired performance and efficiency.

SUMMARY

In one aspect, the present disclosure includes a system for controlling power in a machine. The system includes a controller configured to receive request signals indicative of requested operation of at least one of an electric device and a hydraulic device and operation signals from the at least one device, the operation signals being indicative of a status of the at least one device. The controller is also configured to determine a level of power to be provided or consumed by the at least one device based on the request signals, the operation signals, and a control strategy for controlling at least one of electric and hydraulic power for the machine, and provide control signals for controlling operation of the at least one device. The control strategy includes a subsystem control and a supervisory control. The subsystem control includes at least one of an electric subsystem control for controlling operation of an electric device and a hydraulic subsystem control for controlling operation of a hydraulic device. The subsystem control is configured to provide range signals for at least one of an electric device and a hydraulic device, the range signals being indicative of at least one of a range of acceptable electric power levels and a range of acceptable hydraulic power levels associated with operation of the at least one device. The supervisory control is configured to determine the control signals for controlling operation of the at least one device based on the operation signals, the range signals, and the request signals indicative of requested operation of the at least one device.

According to another aspect, the disclosure includes a method for controlling power in a machine comprising an electric device configured to provide electric power and consume electric power, and a hydraulic device configured to provide hydraulic power and consume hydraulic power. The method includes receiving request signals indicative of requested operation of the electric and hydraulic devices, and receiving operation signals from the electric and hydraulic devices, the operation signals being indicative of a status of the electric and hydraulic devices. The method further includes determining a level of power to be provided or consumed by the electric and hydraulic devices based on the request signals, the operation signals, and a control strategy for controlling electric and hydraulic power for the machine. The method further includes providing control signals for controlling operation of the electric and hydraulic devices, wherein the control strategy includes subsystem controls and a supervisory control. The subsystem controls include an electric subsystem control for controlling operation of the electric device and a hydraulic subsystem control for controlling operation of the hydraulic device. The subsystem controls are configured to provide range signals for the electric and hydraulic devices, the range signals being indicative of a range of acceptable electric and hydraulic power levels associated with operation of the electric and hydraulic devices. The supervisory control is configured to determine the control signals for controlling operation of the electric and hydraulic devices based on the operation signals, the range signals, and the request signals indicative of requested operation of the electric and hydraulic devices.

According to a further aspect, the disclosure includes a machine including a chassis, an operator interface for controlling operation of the machine, an electric device coupled to the chassis, a hydraulic device coupled to the chassis, and a controller. The controller is configured to receive request signals indicative of requested operation of the electric and hydraulic devices, and receive operation signals from the electric and hydraulic devices, the operation signals being indicative of a status of the electric and hydraulic devices. The controller is further configured to determine a level of power to be provided or consumed by the electric and hydraulic devices based on the request signals, the operation signals, and a control strategy for controlling electric and hydraulic power for the machine. The controller is further configured to provide control signals for controlling operation of the electric and hydraulic devices, wherein the control strategy includes subsystem controls and a supervisory control. The subsystem controls include an electric subsystem control for controlling operation of the electric device and a hydraulic subsystem control for controlling operation of the hydraulic device. The subsystem controls are configured to provide range signals for the electric and hydraulic devices, the range signals being indicative of a range of acceptable electric and hydraulic power levels associated with operation of the electric and hydraulic devices. The supervisory control is configured to determine the control signals for controlling operation of the electric and hydraulic devices based on the operation signals, the range signals, and the request signals indicative of requested operation of the electric and hydraulic devices.

DETAILED DESCRIPTION

Figure 1:
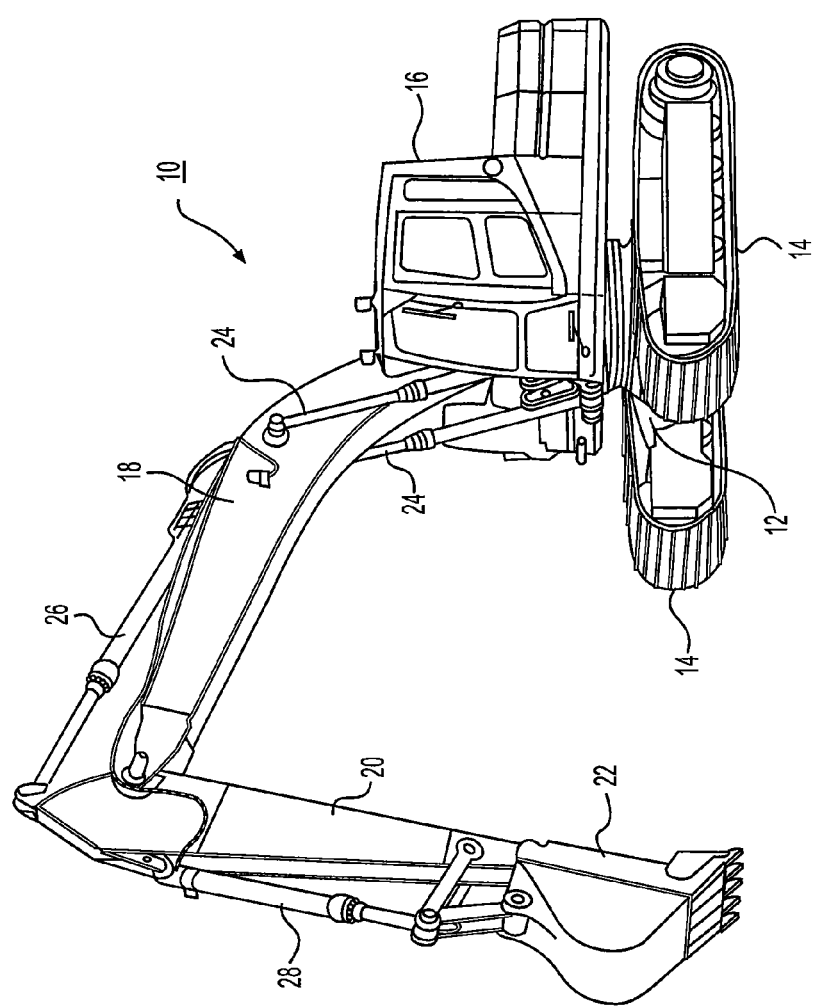
FIG. 1 is a schematic perspective view of an exemplary embodiment of a machine including an exemplary embodiment of system for controlling power in the machine.

FIG. 1 shows an exemplary embodiment of a machine 10 for performing work. In particular, the exemplary machine 10 shown in FIG. 1 is an excavator for performing operations such as digging and/or loading material. Although the exemplary systems and methods disclosed herein are described in relation to an excavator, the disclosed systems and methods have applications in other machines such as an automobile, truck, agricultural vehicle, work vehicle, wheel loader, dozer, loader, track-type tractor, grader, off-highway truck, or any other machines known to those skilled in the art.

As shown in FIG. 1, exemplary machine 10 includes a chassis 12 flanked by ground-engaging members 14 for moving machine 10 (e.g., via ground-engaging tracks or wheels). Machine 10 includes an operator cab 16 mounted to chassis 12 in a manner that permits rotation of cab 16 with respect to chassis 12. A boom 18 is coupled to cab 16 in a manner that permits boom 18 to pivot with respect to cab 16. At an end opposite cab 16, a stick 20 is coupled to boom 18 in a manner that permits stick 20 to pivot with respect to boom 18. At an end opposite boom 18, an implement 22 (e.g., a digging implement or bucket) is coupled to stick 20 in a manner that permits implement 22 to pivot with respect to stick 20. Although exemplary machine 10 shown in FIG. 1 includes a digging implement, other tools may coupled to stick 20 when other types of work are desired to be performed.

In the exemplary embodiment shown, a pair of actuators 24 are coupled to cab 16 and boom 18, such that extension and contraction of actuators 24 raises and lowers boom 18, respectively, relative to cab 16. An actuator 26 is coupled to boom 18 and stick 20, such that extension and retraction of actuator 26 results in stick 20 pivoting inward and outward, respectively, with respect to boom 18. Actuator 28 is coupled to stick 20 and digging implement 22, such that extension and retraction of actuator 28 results in digging implement 22 pivoting between closed and open positions, respectively, with respect to stick 20.

Figure 2:
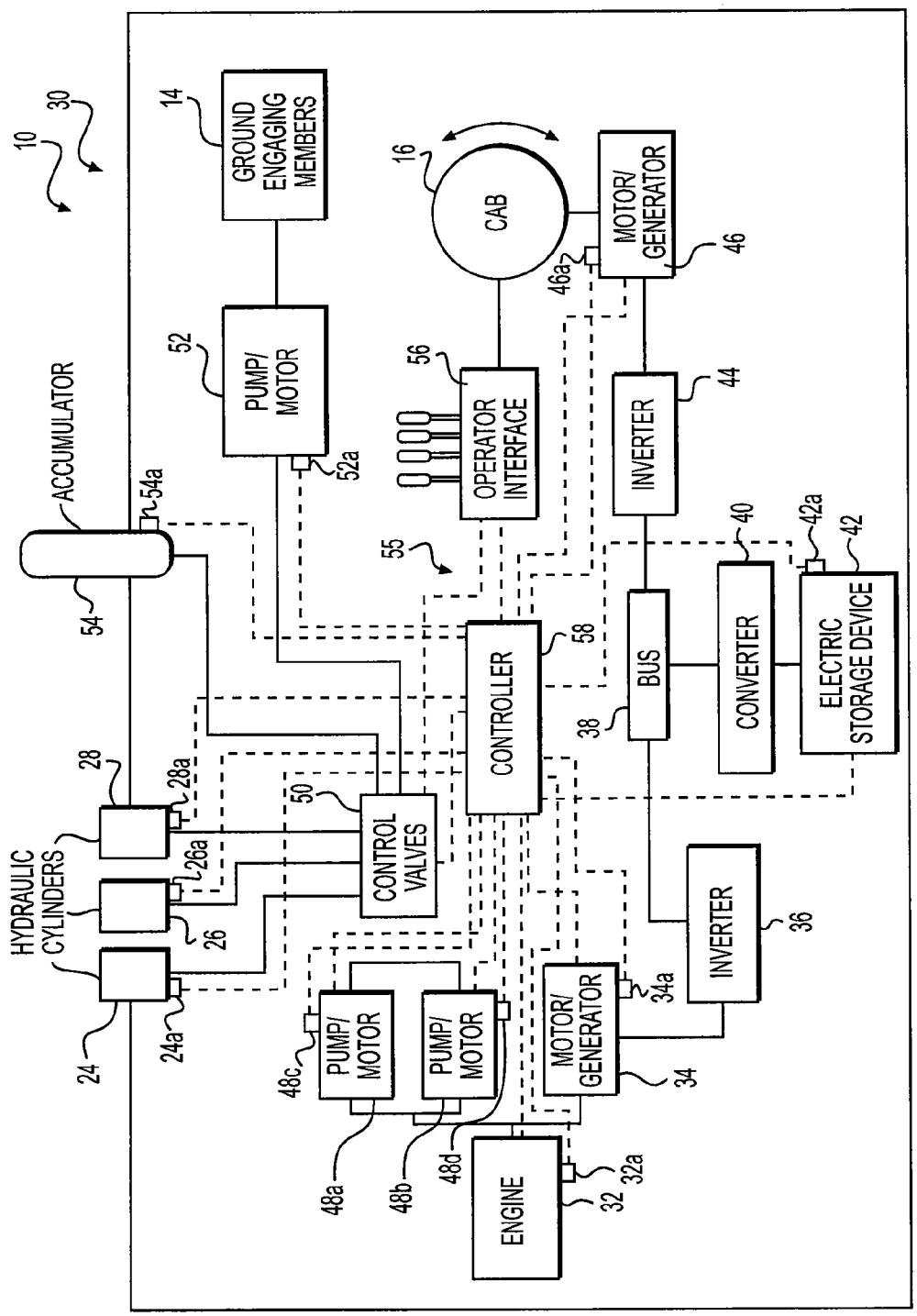
FIG. 2 is a schematic diagram of an exemplary embodiment of a machine including an exemplary embodiment of power system of the machine.

As explained in more detail with respect to FIG. 2, exemplary actuators 24, 26, and 28 are hydraulic devices, in particular, hydraulic cylinders powered by supplying and draining fluid from the cylinders on either side of a piston to cause reciprocating movement of the piston within the cylinder. One or more of actuators 24, 26, and 28 may be non-hydraulic actuators without departing from the concepts disclosed herein. In addition, the number of each of actuators 24, 26, and 28 coupled to boom 18, stick 20, and/or implement 22, respectively, may be changed without departing from the concepts disclosed herein.

Referring to FIG. 2, exemplary machine 10 includes a power system 30 including electric and hydraulic devices operated respectively via electric and hydraulic power sources and controlled by a controller. In particular, exemplary power system 30 includes an internal combustion engine 32. Engine 32 may be, for example, a compression-ignition engine, a spark-ignition engine, a gas turbine engine, a homogeneous-charge compression ignition engine, a two-stroke engine, a four-stroke, or any type of internal combustion engine known to those skilled in the art. Engine 32 may be configured to operate on any fuel or combination of fuels, such as, for example, diesel, bio-diesel, gasoline, ethanol, methanol, or any fuel known to those skilled in the art. Further, engine 32 may be supplemented by a hydrogen-powered engine, fuel-cell, solar cell, and/or any power source known to those skilled in the art.

In the exemplary embodiment shown, power system 30 includes an electric motor/generator 34 (e.g., an AC motor/generator) coupled to engine 32, such that engine 32 drives motor/generator 34, thereby generating electric power. Motor/generator 34 is electrically coupled to an inverter 36 (e.g., an AC-DC inverter), which, in turn, is electrically coupled to a bus 38 (e.g., a DC bus). The exemplary power system 30 further includes a converter 40 electrically coupled to bus 38. Converter 40 may be a DC-DC bi-directional converter, which, in turn, is electrically coupled to an electric storage device 42. Electric storage device 42 may include one or more batteries and/or ultra-capacitors configured to store electric energy supplied from motor/generator 34 and/or or any electrical energy generated by capturing energy associated with operation of machine 10, such as energy captured from regenerative braking of moving parts of 10 machine, such as, for example, ground-engaging members 14 and/or rotation of cab 16. Electric energy stored in electric storage device 42 may be used as a source of electric power as explained in more detail below.

Exemplary power system 30 further includes an inverter 44 (e.g., an AC-DC inverter) coupled to bus 38. Inverter 44 is electrically coupled to an electric motor/generator 46 (e.g., an AC motor/generator). In the exemplary embodiment shown, motor/generator 46 is coupled to cab 16 such that operation of motor/generator 46 results in cab 16 rotating relative to chassis 12. In addition, motor/generator 46 may be capable of slowing and stopping rotation of cab 16 in a regenerative manner that results in electric energy being generated that may be routed via inverter 44, bus 38, and converter 40 to electric storage device 42 for later supply to electric actuators such as motor/generators 34 and 46. According to some embodiments, electric energy in electric storage device 42 may be routed via converter 40, bus 38, and inverter 36 to motor/generator 34, which may then use the electric energy to supplement engine 32 and/or drive one or more of hydraulic pump/motors 48a and 48b, thus enabling electric power sources to assist engine 32 and/or hydraulic devices in machine 10. According to some embodiments, electric energy generated by motor/generator 34 and/or motor/generator 46 may be routed between the two motor/generators 34 and 46 without necessarily being stored in electric storage device 42, for example, by being routed from motor/generator 46, via inverter 44, bus 38, and inverter 36 to motor/generator 34, or from motor/generator 34, via inverter 36, bus 38, and inverter 44 to motor/generator 46.

In the exemplary embodiment shown in FIG. 2, engine 32 is coupled to two hydraulic pump/motors 48a and 48b, which may include fixed-displacement or variable-displacement pumps. Although the exemplary embodiment shown includes two pump/motors 48a and 48b, a single pump/motor or more than two pump/motors may be used. In the exemplary configuration shown, engine 32 supplies mechanical power to drive pump/motors 48a and 48b, which, in turn, provide hydraulic power to power system 30 by causing pressurized fluid to flow to and from hydraulic cylinders 24, 26, and 28. In addition, according to some embodiments, one or more of pump/motors 48a and 48b may supply power to engine 32 to assist with operation of engine 32, for example, to drive motor/generator 34, which may, in turn, supply electric power to electric devices of machine 10.

In the exemplary embodiment shown in FIG. 2, pump/motors 48a and 48b are hydraulically coupled to control valves 50, such that pump/motors 48a and 48b supply pressurized fluid to control valves 50, which, in turn, control fluid flow to and from hydraulic devices of machine 10. For example, as shown in FIG. 2, control valves 50 are hydraulically coupled to hydraulic cylinders 24, 26, and 28, and hydraulic pump/motor 52, which, when supplied with pressurized fluid flow, drive ground-engaging members 14. Although a single hydraulic motor 52 is shown, power system 30 may include one or more hydraulic motors 52, for example, one for each of ground-engaging members 14. Further, hydraulic pump/motor(s) 52 may be capable of slowing and stopping ground-engaging members 14 in a regenerative manner that results in hydraulic energy being generated that may be rerouted to provide hydraulic power to power system 30, stored in a hydraulic storage device for later supply of hydraulic power to hydraulic actuators, and/or to provide hydraulic power to pump/motors 48a and 48b, which may supplement power of engine 32, as explained in more detail below.

Exemplary power system 30 also includes an accumulator 54 hydraulically coupled to control valves 50. Accumulator 54 is configured to store hydraulic energy captured during operation of power system 30. For example, as explained above, hydraulic motor(s) 52 may be configured to slow movement of ground-engaging members 14 by operating as pumps such that ground-engaging members 14 drive the pumps, thereby slowing ground-engaging members 14. The energy supplied to the hydraulic fluid by virtue of the pumping may be routed via control valves 50 for storage in accumulator 54 for later use, and/or to pump/motors 48a and 48b.

In the exemplary power system 30, hydraulic cylinders 24, 26, and 28 are each hydraulically coupled to control valves 50. As explained with respect to FIG. 1, hydraulic cylinders 24, 26, and 28 are respectively coupled to boom 18, stick 20, and implement 22 for manipulating boom 18, stick, 20, and implement 22. Similar to hydraulic motor(s) 52, hydraulic cylinders 24, 26, and 28 may be operated in a regenerative manner that results in hydraulic energy being generated, which may be rerouted to provide hydraulic power to power system 30 and/or stored in accumulator 54. For example, if boom 18 is lowered from an elevated position, pressurized fluid is forced in a controlled manner from hydraulic cylinder 24. This pressurized fluid may be routed via control valves 50 for storage in accumulator 54, and/or to one or more of pump/motors 48a, 48b, and 52 for assisting operation of those hydraulic devices.

Exemplary power system 30 shown in FIG. 2 includes a system 55 for controlling power system 30. For example, power system 30 includes an operator interface 56 that may be contained in cab 16. According to some embodiments, operator interface 56 may be located remote from machine 10 for remote control of machine 10. Exemplary operator interface 56 includes a number of controls (e.g., levers, pedals, and/or buttons) for control of machine 10 and its functions. In the exemplary embodiment shown, operator interface 56 is coupled to control valves 50, electrically and/or hydraulically, so that electric control signals and/or hydraulic control signals (e.g., via a hydraulic pilot circuit) may be sent from operator interface 56 to control valves 50. Such electric and hydraulic control signals may be used to control operation of controls valves 50 for operation and control of the hydraulic devices of power system 30. In addition, operator interface 56 is coupled electrically to a controller 58 configured to control operation of one or more electric and hydraulic devices of exemplary power system 30, as explained in more detail below.

In addition, controller 58 may be coupled to a number of sensors associated with the devices of machine 10 in order to receive signals indicative of the operation of the devices. For example, machine 10 may include the following sensors: engine sensor 32a associated with engine 32, motor/generator sensor 34a associated with motor/generator 34, storage device sensor 42a associated with electric storage device 42, motor/generator sensor 46a associated with motor/generator 46, pump/motor sensors 48c and 48d associated respectively with pump/motors 48a and 48b, hydraulic sensors 24a, 26a, and 28a associated respectively with hydraulic cylinders 24, 26, and 28, accumulator sensor 54a associated with accumulator 54, and pump/motor sensor 52a associated with pump/motor 52. Each of the sensors identified above may include a single sensor or a number of sensors operating together to provide signals indicative of the operation of the associated device.

Engine sensor 32a may include an engine speed sensor, a mass air-flow sensor, an emissions sensor, a manifold pressure sensor, a turbocharger boost pressure sensor, and/or other engine-related sensors. Motor/generator sensors 34a and 46a may include a speed sensor, a current sensor, a voltage sensor, and/or other motor/generator-related sensors. Storage device sensor 42a may include a charge sensor, a current sensor, a voltage sensor, and/or other electric storage device-related sensors. Pump/motor sensors 48c, 48d, and 52a may include a speed sensor, a flow rate sensor, a pressure sensor, and/or other hydraulic-related sensors. Accumulator sensor 54a may include a pressure sensor and/or other hydraulic-related sensors.

Controller 58 may include one or more processors, microprocessors, central processing units, on-board computers, electronic control modules, and/or any other computing and control devices known to those skilled in the art. Controller 58 may be configured run one or more software programs or applications stored in a memory location, read from a computer-readable medium, and/or accessed from an external device operatively coupled to controller 58 by any suitable communications network.

Exemplary controller 58 is configured to control operation of power system 30, including the engine and various electric and hydraulic devices of exemplary machine 10. For example, controller 58 may be configured view each of the electric and hydraulic devices as both potential suppliers and consumers of electric and hydraulic power, and upon receipt of operator requests, control operation of the engine and electric and hydraulic devices in a coordinated manner to provide desired machine performance and efficiency.

For example, electric motor/generators 34 and 46 may operate by either consuming electric power or supplying electric power. They may consume electric power when operated to accelerate a device driven by motor/generators 34 and 46. For example, motor/generator 34 may be driven to assist engine 32 with supplying power to hydraulic pump/motors 48a and 48b, and motor/generator 46 may be driven to rotate cab 16. Motor/generator 34 may also supply electric power to power system 30 when operated to decelerate engine 32 (e.g., when engine 32 is coupled to a flywheel storage device (not shown)), using the generator portion of motor/generator 34 to generate electric power as driven by engine 32. Motor/generator 46 may also operate to supply electric power to power system 30 in a similar manner when decelerating rotation of cab 16. In addition, motor/generators 34 and 46 may supply electric power to each other and to energy storage device 42 when operating in a generator mode.

Energy storage device 42 may also operate as either a supplier or consumer of electric power. For example, energy storage device 42 may operate as a supplier of electric power by providing electric power to motor/generator 34 to assist output of engine 32 and/or to motor/generator 46 to rotate cab 16. Electric storage device 42 may also act as a consumer of electric power when it stores electric power received from motor/generators 34 and 46.

The hydraulic devices may also be viewed as both consumers and suppliers of hydraulic power. For example, pump/motors 48a, 48b, and 52 may operate by either consuming hydraulic power or supplying hydraulic power. They may consume hydraulic power when operated to increase the flow rate and/or pressure in the hydraulic system, for example, to operate hydraulic cylinders 24, 26, and 28 against a load. In addition, pump/motors 48a, 48b, and 52 may operate to consume hydraulic power to drive another of the pump/motors and/or to provide pressurized fluid to accumulator 54. For example, one or more of pump/motors 48a and 48b may operate as a pump to provide fluid to drive pump/motor 52 to drive ground engaging members 14 for moving machine 10.

Pump/motors 48a, 48b, and/or 52 may also supply hydraulic power to power system 30. For example, as motion of the machine 10 is slowed via pump/motor 52, pump/motor 52 may convert the kinetic energy of machine 10 by pumping hydraulic fluid, thereby supplying hydraulic power to power system 30, which may be used by pump/motors 48a and 48b to assist engine 32 with supplying power to electric motor/generator 34, to assist with operation of hydraulic cylinders 24, 26, and 28 against a load, and/or to supply pressurized fluid to accumulator 54 for storage.

Similarly, hydraulic cylinders 24, 26, and 28 may operate to either consume or supply hydraulic power. For example, as boom 18 is lowered, hydraulic cylinder 24 may operate to supply hydraulic power in the form of pressurized fluid to the hydraulic system, which may be used to supply power to pump/motors 48a, 48b, and 52, other hydraulic cylinders 26 and 28, and/or accumulator 54. Hydraulic cylinder 24 may also operate as a power consumer when acting against a load (e.g., to raise boom 18) by drawing hydraulic power from one or more of pump/motors 48a, 48b, and 52, accumulator 54, and/or other hydraulic cylinders 26 and 28.

Accumulator 54 may also operate as either a supplier or consumer of hydraulic power. For example, accumulator 54 may operate as a supplier of hydraulic power by providing pressurized fluid to pump/motors 48a and 48b to assist output of engine 32, to hydraulic cylinders 24, 26, and 28 to act against a load, and/or to pump/motor 52 to drive ground engaging members 14. Accumulator 54 may operate as a consumer of hydraulic power when it stores hydraulic power in the form of pressurized fluid received from pump/motors 48a, 48b, and 52, and/or hydraulic cylinders 24, 26, and 28.

Exemplary controller 58 is configured to receive request signals indicative of requested operation of the electric and hydraulic devices, for example, signals received from operator interface 56, and control electric and hydraulic power in machine 10 according to a control strategy. For example, controller 58 may be configured to receive the request signals from interface 56 and operation signals from the electric and hydraulic devices upon receipt of the request signals. The operation signals are indicative of the status of the respective electric and hydraulic devices at the time of receipt of the request signals. For example, the operation signals may be signals received from the sensors associated with the respective electric and hydraulic devices and may include information about the power being supplied or consumed by the electric and hydraulic devices upon receipt of the request signals. The operation signals may also be indicative of the ability of the electric and hydraulic devices to either provide power or consume power upon receipt of the request signals by controller 58. According to some embodiments, operation signals may also include signals associated with operation of engine 32. Controller 58 may determine the level of power to be supplied or consumed by engine 32 and the electric and hydraulic devices based on the request signals, the operation signals, and the control strategy, and provide control signals for controlling operation of engine 32 and the electric and hydraulic devices of machine 10.

Figure 3:
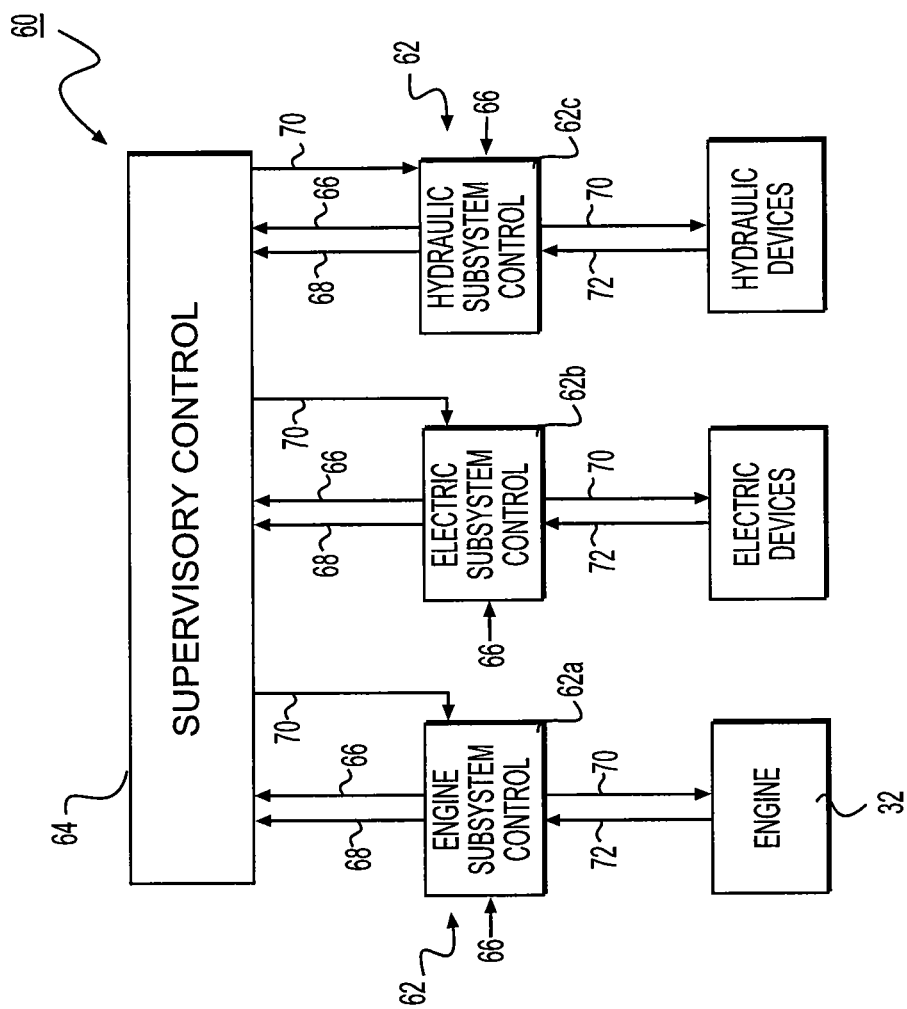
FIG. 3 is a schematic diagram of an exemplary control strategy for operation of and engine and electric and hydraulic devices in an exemplary machine.

FIG. 3 is a schematic diagram of an exemplary control strategy 60 for operation of engine 32 and electric and hydraulic devices in exemplary machine 10. As shown in FIG. 3, exemplary control strategy 60 includes subsystem controls 62 and a supervisory control 64. Exemplary subsystem controls 62 include an engine subsystem control 62a for controlling operation of engine 32, an electric subsystem control 62b for controlling operation of the electric devices of the electric subsystem, and a hydraulic subsystem control 62c for controlling operation of the hydraulic devices of the hydraulic subsystem. Some embodiments may include additional subsystem controls for controlling operation of other devices.

Subsystem controls 62 are configured to provide supervisory control 64 with the request signals 66 indicative of the requested operation of the electric and hydraulic devices. According to some embodiments, supervisory control 64 may receive request signals 66 directly from a source other than subsystem controls 62, such as, for example, interface 56 and/or engine 32 and the electric and hydraulic devices themselves.

Subsystem controls 62 are also configured to provide request and range signals for operation of the energy storage devices associated with the respective electric subsystem and the hydraulic subsystem based on the interrelationship of operation of the devices within the respective subsystem. For example, within the electric subsystem, electric subsystem control 62*b* provides request signals for controlling operation of electric storage device 42 based on the operation of the other devices within the electric subsystem. Similarly, within the hydraulic subsystem, hydraulic subsystem control 62*c* provides request signals for controlling operation of accumulator 54 based on the operation of the other devices within the hydraulic subsystem.

Subsystem controls 62 are also configured to provide range signals 68 indicative of a range of acceptable electric and hydraulic power levels associated with operation of the electric and hydraulic devices upon receipt of request signals 66. Range signals 68 may also be based on how the device functions within a respective subsystem. For example, for the electric subsystem, range signals 68 for the respective electric devices may be based on the interrelationship of the operation of the electric devices within the electric subsystem, for example, as explained in more detail below with respect to electric storage device 42. Similarly, for the hydraulic subsystem, range signals 68 for the respective hydraulic devices may be based on the interrelationship of the operation of the hydraulic devices within the hydraulic subsystem, for example, as explained in more detail below with respect to accumulator 54.

Supervisory control 64 is configured to determine control signals 70 for controlling operation of engine 32 and the electric and hydraulic devices based on operation signals 72 (described previously herein), range signals 68, and request signals 66 indicative of requested operation of the electric and hydraulic devices. In this exemplary manner, controller 58 evaluates operation of engine 32 and the electric and hydraulic devices, the requested operation of the devices, and controls operation of engine 32 and the devices in a coordinated manner to provide the desired machine performance and improve efficiency.

According to some embodiments, the range of acceptable electric power and hydraulic power levels is indicative of maximum and minimum power levels at which the electric and hydraulic devices are permitted to operate upon receipt of request signals 66 by controller 58. For example, the maximum and minimum power levels may be based on the capacity of the respective device to supply power or consume power, or to supply or consume power based on predetermined design limits. For example, pump/motor 48*a* may have a maximum pumping power output, and thus, the maximum power output level may be limited to the maximum pumping power output. As viewed from the perspective of engine 32, this would represent a maximum power consumption limit. However, as viewed from the perspective of hydraulic cylinders 24, 26, and 28, accumulator 54, and pump/motor 52, this would represent a maximum power supply limit. Alternatively, the maximum pumping power output of pump/motor 48*a* might be limited based on a predetermined design limit, for example, to avoid excessive wear on pump/motor 48*a* and/or other parts of machine 10.

The minimum power levels of range signals 68 may relate to a predetermined lower limit of acceptable power output. For example, for pump/motors 48*a* and 48*b*, the lower limit may be associated with the minimum power output to provide hydraulic cylinders 24, 26, and 28 with sufficient hydraulic power to hold a load in implement 22 at a current height.

Engine 32 may also provide, via its associated sensors 32*a*, operation signals 72 indicative of the status of engine 32 (e.g., the current power output and speed). Engine subsystem control 62*a* may provide range signals 68 indicative of maximum and minimum power levels at which engine 32 is permitted to operate upon receipt of request signals 66 by controller 58.

According to some embodiments, the ranges of acceptable electric, hydraulic, and engine power output levels provide limits for supervisory control 64, so that supervisory control 64 does not provide control signals 70 for the electric devices, hydraulic devices, and engine 32 that fall outside the respective limits. As a result, although supervisory control 64 may determine a most efficient solution (i.e., based on power consumption considerations alone) for operating the power output levels of engine 32 and the electric and hydraulic devices, the ranges may prevent unintended and undesirable consequences of the most efficient solution.

For example, upon receipt of a request for deceleration of the rotation of cab 16 by controller 58, motor/generator 46 may operate as a generator, thereby supplying electric power to machine 10. If motor/generator 46 increases the level of deceleration of cab 16, it would supply a larger amount of electric power. However, this might result in the rotation of cab 16 stopping more quickly than the request calls for, thereby resulting in undesirable control characteristics. If motor/generator 46 decreases the level of deceleration of cab 16, it would supply a smaller amount of electric power. However, this might result in the rotation of cab 16 stopping more slowly than the request calls for, thereby also resulting in undesirable control characteristics.

When controller 58 receives a request signal 66 for decelerating cab 16, electric subsystem control 62*b* may determine a range of acceptable power supply levels for motor/generator 46 during deceleration. As noted above, because it might not be desirable for operation of machine 10 to reduce or increase the level of deceleration of cab 16, electric subsystem control 62*b* may determine a narrow range of acceptable power supply levels under these circumstances. Thus, electric subsystem control 62*b* would provide to supervisory control 64 request signal 66 indicative of the requested operation of motor/generator 46 and range signal 68 indicative of a narrow range of acceptable power supply levels for motor/generator 46. Supervisory control 64 would thereafter control operation of motor/generator 46 by determining a level of power supply to be provided by motor/generator 46 based on request signals 66, operation signals 72 of engine 32 and the various devices of machine 10, and range signal 68 received from electric subsystem control 62*b*. Thereafter, control signals 70 are provided to motor/generator 46 to control its operation. Control signals 70 may be sent from supervisory control 64 to electric subsystem control 62*b*, which may thereafter control operation of motor/generator 46. According to some embodiments, control signals 70 may be sent directly to motor/generator 46 without necessarily being relayed through electric subsystem control 62*b*.

As another example, during acceleration of cab 16, controller 58 receives request signal 66 for acceleration, and motor/generator 46 operates as a motor, thereby consuming electric power from machine 10. If motor/generator 46 increases the level of acceleration of cab 16, it would consume a larger amount of electric power. If motor/generator 46 decreases the level of acceleration of cab 16, it would consume a smaller amount of electric power.

Electric subsystem control 62*b* may determine a range of acceptable power consumption levels for motor/generator 46 during acceleration of cab 16. For example, it might not be desirable for operation of machine 10 to increase the acceleration of cab 16 beyond the requested level. However, due to power limits in machine 10 or other considerations, it may be desirable to reduce the level of acceleration below the requested level. Thus, electric subsystem control 62*b* may provide a range of acceptable power consumption levels from a maximum equal to the requested level to a minimum well below the requested level. Electric subsystem control 62*b* would provide to supervisory control 64 a request signal 66 indicative of the requested operation of motor/generator 46 and a range signal 68 indicative of the range of acceptable power supply levels. Thereafter, supervisory control 64, using control signals 72, controls operation of motor/generator 46, for example, in the manner previously described, by determining a level of power for consumption by motor/generator 46 based on request signal 66 and range signal 68 received from electric subsystem control 62*a*, and operation signals 72 of engine 32 and the various devices of machine 10.

Electric subsystem control 62*b* may determine a range for operation of electric storage device 42 based on the interrelationship of the operation of the electric devices within the electric subsystem. For example, if no electric devices are operating within electric subsystem, electric subsystem control 62*b* may provide supervisory control 64 with a request signal indicating no requests for electric devices and a range signal 68 for each of the electric devices, which indicates the ability of the electric devices, including electric storage device 42, to supply power to engine 32 and/or hydraulic subsystem via supplement of power to engine 32 for operation of one or more of pump/motors 48*a* and 48*b*.

However, if, for example, a request signal 66 is received for rotation of cab 16 (via motor/generator 46), electric subsystem control 62*b* supplies supervisory control 64 with request signals 66 for each of the electric devices, including electric storage device 42. In addition, electric subsystem control 62*b* provides range signals 68 for each of the electric devices. For example, request signal 66 for operation of motor/generator 46 for rotation of cab 16 may request 50 units of electric power. Electric subsystem control 62*b* determines that motor/generator 34 being driven by engine 32 has the ability to provide 40 units of electric power to motor/generator 46 to rotate cab 16, and electric storage device 42 has the ability to provide 40 units of electric power to motor/generator 46 to rotate cab 16. Thus, motor/generator 34 and electric storage device 42 have a total of 30 units of excess capacity to meet the requested rotation of cab 16. Electric subsystem control 62*b* determines respective range signals 66 for motor/generator 34 and electric storage device 42 indicating a range of power outputs of 0-40 units of power for each of motor/generator 34 and electric storage device 42, and a request signal 66 of 50 units for motor/generator 46 for rotation of cab 16. Electric subsystem control 62*b* also determines a range signal for motor/generator 46 as outlined previously herein. Also, electric subsystem control 62*b* determines request signals 66 for each of motor/generator 34 and electric storage device 42 to provide the 50 units of power to motor/generator 46. For example, electric subsystem control 62*b* determines that the request signal 66 for motor/generator 34 will be 40 units of power, and the request signal for electric storage device 42 will be 10 units of power, thereby corresponding to the 50 units of electric power requested for operation of motor/generator 46 to rotate cab 16. The request signals 66 and range signals 68 are supplied to supervisory control 64.

In this example, supervisory control 64 uses the request and range signals 66 and 68 from electric subsystem control 62*b*, as well as similar signals from engine subsystem control 62*a* and hydraulic subsystem control 62*c*, to determine control signals 70 for controlling operation of engine 32 and the electric and hydraulic devices of machine 10. For example, if electric power is not needed for supplementing engine 32 or the hydraulic system, supervisory control 64 may provide control signals 70 to electric subsystem control 62*b*, such that motor/generator 34 supplies, for example, 40 units of power to motor/generator 46, and electric storage device 42 supplies 10 units of power to motor/generator 46, thereby meeting the requested 50 units to rotate cab 16.

However, if supervisory control 64 determines that the hydraulic subsystem would benefit from power supplied by the electric subsystem, for example, if the hydraulic subsystem is unable to supply enough hydraulic power to meet the requested operation demands of the hydraulic subsystem, for example, because of limited capability of engine 32 and/or an inability of accumulator 54 to offset the limited capability of engine 32, supervisory control 64 may determine that the electric subsystem may supply power to supplement operation of engine 32 by, for example, 20 units of power, thereby increasing the capability of the hydraulic subsystem. Because the output of pump/motors 48*a* and 48*b* may be limited due to instantaneous engine capability, supplementing operation of engine 32 with the electric subsystem may enable an increase in the hydraulic power pump/motors 48*a* and 48*b* may supply. Thus, in order to meet the 20-unit power demand for supplementing engine 32 and the 50-unit power demand of the request to rotate cab 16, 70 units of power may be supplied from the combined 80 units of available power from motor/generator 34 and electric storage device 42, so that 50 units are supplied to rotate cab 16, and 20 units are supplied to hydraulic subsystem via power supplied to engine 32.

In a similar manner, hydraulic subsystem control 62*c* may determine a range for operation of accumulator 54 based on the interrelationship of the operation of the hydraulic devices within the hydraulic subsystem. For example, if no hydraulic devices are operating within hydraulic subsystem, hydraulic subsystem control 62*c* may provide supervisory control 64 with a request signal indicating no requests for hydraulic devices and a range signal 68 for each of the hydraulic devices, which indicates the ability of the hydraulic devices, including accumulator 54, to supply power to engine 32 and/or electric subsystem via supplement of power to engine 32 for operation of motor/generator 34 of the electric subsystem.

However, if, for example, a request signal 66 is received for movement of machine 10 (via pump/motor 52 and ground engaging members 14), hydraulic subsystem control 62*c* supplies supervisory control 64 with request signals 66 for each of the hydraulic devices, including accumulator 54. In addition, hydraulic subsystem control 62*c* provides range signals 68 for each of the hydraulic devices. For example, request signal 66 for operation of pump/motor 52 for movement of machine 10 may request 60 units of electric power. Hydraulic subsystem control 62*c* determines that pump/motors 48*a* and 48*b* being driven by engine 32 have the ability to provide 50 units of hydraulic power to motor/generator 46 to move machine 10, and accumulator 54 has the ability to provide 30 units of hydraulic power pump/motor 52 to move machine 10. (According to some embodiments, hydraulic cylinders 24, 26, and/or 28 may be used to supply hydraulic power to pump/motor 52, as described previously herein.) Thus, pump/motors 48*a* and 48*b* and accumulator 54 have a total of 20 units of excess capacity to meet the requested movement of machine 10. Hydraulic subsystem control 62*c* determines respective range signals 66 for pump/motors 48*a* and 48*b* and accumulator 54 indicating a range of power outputs of 0-50 units for pump/motors 48*a* and 48*b* and 0-30 units of power for accumulator 54, and a request signal 66 of 60 units for pump/motor 52 for movement of machine 10. Hydraulic subsystem control 62c also determines a range signal for pump/motor 52 as outlined previously herein. Also, hydraulic subsystem control 62c determines request signals 66 for each of pump/motors 48a and 48b and accumulator 54 to provide the 60 units of power to pump/motor 52. For example, hydraulic subsystem control 62c determines that the request signal 66 for pump/motors 48a and 48b will be 50 total units of power, and the request signal 66 for accumulator 54 (and/or hydraulic actuators 24, 26, and/or 28) will be 10 units of power, thereby corresponding to the 60 units of hydraulic power requested for operation of pump/motor 52 to move machine 10. The request signals 66 and range signals 68 are supplied to supervisory control 64.

In this example, supervisory control 64 uses the request and range signals 66 and 68 from hydraulic subsystem control 62c, as well as similar signals from engine subsystem control 62a and electric subsystem control 62b, to determine control signals for controlling operation of engine 32 and the electric and hydraulic devices of machine 10. For example, if hydraulic power is not needed for supplementing engine 32 or the electric subsystem, supervisory control 64 may provide control signals 70 to hydraulic subsystem control 62c, such that pump/motors 48a and 48b supply, for example, 50 units of power to pump/motor 52, and accumulator 54 supplies 10 units of power to pump/motor 52, thereby meeting the requested 60 units to move machine 10.

However, if supervisory control 64 determines that the electric subsystem would benefit from power supplied by the hydraulic subsystem, for example, if the electric subsystem was unable by itself to supply enough electric power to meet the requested operation demands of the electric subsystem, supervisory control 64 may determine that the hydraulic subsystem may supply power to supplement operation of engine 32 by, for example, 20 units of power. Thus, in order to meet the 20-unit power demand for supplementing engine 32 and the 60-unit power demand of the request to move machine 10, 80 units of power may be supplied from the combined 80 units of available power from pump/motors 48a and 48b and accumulator 54, so that 60 units are supplied to move machine 10, and 20 units are supplied to electric subsystem via power supplied to engine 32.

Figure 4:
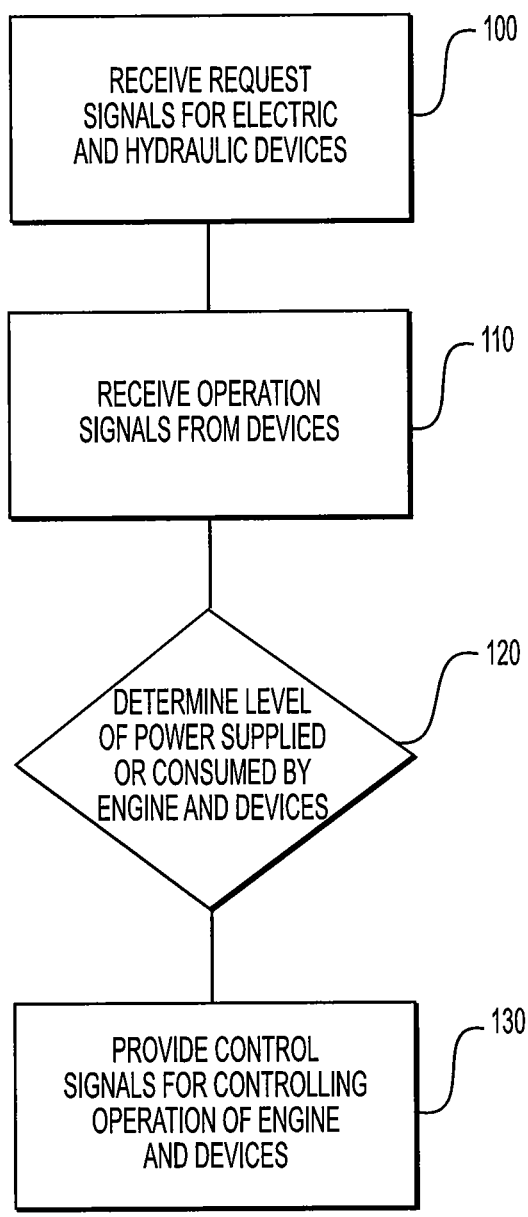
FIG. 4 is a flow diagram of an exemplary embodiment of a method for controlling power in an exemplary machine.

FIG. 4 shows a flow diagram of an exemplary embodiment of a method for controlling power in exemplary machine 10. As shown in FIG. 4, exemplary method begins at step 100 with receipt of request signals 66 indicative of requested operation of the electric and hydraulic devices by controller 58 from, for example, operator interface 56. Upon receipt of request signals 66, at step 110 controller 58 receives operation signals 72 from the various sensors associated with operation of engine 32 and the electric and hydraulic devices. Operation signals 72 are indicative of the status of engine 32 and the electric and hydraulic devices, for example, and may provide information about the current capabilities of engine 32 and the various devices, such as the current power output, the current level of energy storage, the current power consumption, and the current ability to supply or consume power.

Following receipt of request signals 66 and operation signals 72, at step 120 controller 58 determines the level of power to be supplied or consumed by engine 32 and the various electric and hydraulic devices of machine 10. In this exemplary method, this determination is made based on request signals 66, operation signals 72, and control strategy 60 for controlling electric and hydraulic power for machine 10, for example, by controlling operation of engine 32 and the electric and hydraulic devices.

According to the exemplary embodiment described previously herein, control strategy 60 includes engine subsystem control 62a for controlling engine 32, electric subsystem control 62b for controlling the electric devices of machine 10, and hydraulic subsystem control 62c for controlling the hydraulic devices of machine 10. Exemplary control strategy 60 also includes supervisory control 64, which provides at step 130 control signals 70 for controlling operation of engine 32 and the electric and hydraulic devices based on request signals 66, operation signals 72, and signals received from engine subsystem control 62a, electric subsystem control 62b, and hydraulic subsystem control 62c. Subsystem controls 62 provide range signals 68 indicative of the range of acceptable power levels (power consumption or supply levels) associated with operation of engine 32 and the electric and hydraulic devices.

According to this exemplary method, the power in machine 10 may be controlled in a manner resulting in machine 10 having desired operation characteristics and improved efficiency. In particular, engine 32 and the electric and hydraulic devices may be operated in a coordinated manner, so that they consume and supply power to machine 10 in an efficient manner, while still maintaining desirable operation characteristics.

The exemplary systems and methods described above include a combination of electric and hydraulic devices and a combination of electric and hydraulic storage devices. It is contemplated that the systems and methods described herein may not include both electric and hydraulic devices, or may not include both electric and hydraulic storage devices. For example, the systems and methods may be used in machines having electric devices and electric storage devices, or a combination of electric devices, electric storage devices, and non-hydraulic devices (e.g., non-hydraulic storage devices, such as, for example, a non-hydraulic, mechanical storage device such as a flywheel). Alternatively, the systems and methods may be used in machines having hydraulic devices and hydraulic storage devices, or a combination of hydraulic devices, hydraulic storage devices, and non-electric devices (e.g., non-electric storage devices, such as, for example, a non-electric, mechanical storage device such as a flywheel).

INDUSTRIAL APPLICABILITY

Exemplary machine 10 may be used for performing work. In particular, exemplary machine 10 shown in FIG. 1 is an excavator for performing operations such as digging and/or loading material. Although the exemplary systems and methods disclosed herein are described in relation to an excavator, the disclosed systems and methods have applications in other machines such as an automobile, truck, agricultural vehicle, work vehicle, wheel loader, dozer, loader, track-type tractor, grader, off-highway truck, or any other machines known to those skilled in the art.

Exemplary system 55 for controlling power in machine 10 may be used to control power in a machine having both electric and hydraulic devices that may act as either power suppliers or consumers. In particular, exemplary system 55 controls the power supply and consumption of the electric and hydraulic devices in a manner that improves the efficiency of a machine, while maintaining desirable control characteristics of the machine. The electric and hydraulic devices may include electric and hydraulic storage devices as well as electric and hydraulic actuators, such as, for example, electric motors, electric generators, electric motor/generators, hydraulic pumps, hydraulic motors, hydraulic pump/motors, and hydraulic cylinders.

It will be apparent to those skilled in the art that various modifications and variations can be made to the exemplary disclosed systems, methods, and machine. Other embodiments will be apparent to those skilled in the art from consideration of the specification and practice of the exemplary disclosed embodiments. It is intended that the specification and examples be considered as exemplary only, with a true scope being indicated by the following claims and their equivalents.

What is claimed is:

1. A system for controlling power in a machine, the system comprising:
a controller configured to:
receive request signals indicative of requested operation of at least one of an electric device and a hydraulic device;
receive operation signals from the at least one device, the operation signals being indicative of a status of the at least one device;
determine a level of power to be provided or consumed by the at least one device based on the request signals, the operation signals, and a control strategy for controlling at least one of electric power and hydraulic power for the machine; and
provide control signals for controlling operation of the at least one device,
wherein the control strategy includes a subsystem control and a supervisory control,
wherein the subsystem control includes at least one of an electric subsystem control for controlling operation of an electric device and a hydraulic subsystem control for controlling operation of a hydraulic device,
wherein the subsystem control is configured to provide range signals for at least one of an electric device and a hydraulic device to the supervisory control, the range signals being indicative of at least one of a range of acceptable electric power levels and a range of acceptable hydraulic power levels associated with operation of the at least one device, and
wherein the supervisory control is configured to receive the range signals from the subsystem control and determine the control signals for controlling operation of the at least one device based on the operation signals, the range signals, and the request signals indicative of requested operation of the at least one device.

2. The system of claim 1, wherein the machine comprises an electric device configured to provide electric power and consume electric power, and a hydraulic device configured to provide hydraulic power and consume hydraulic power, and wherein the controller is configured to:
receive request signals indicative of requested operation of the electric and hydraulic devices;
receive operation signals from the electric and hydraulic devices, the operation signals being indicative of a status of the electric and hydraulic devices;
determine a level of power to be provided or consumed by the electric and hydraulic devices based on the request signals, the operation signals, and a control strategy for controlling electric and hydraulic power for the machine; and
provide control signals for controlling operation of the electric and hydraulic devices,
wherein the control strategy includes subsystem controls and a supervisory control,
wherein the subsystem controls include an electric subsystem control for controlling operation of the electric device and a hydraulic subsystem control for controlling operation of the hydraulic device,
wherein the subsystem controls are configured to provide range signals for the electric and hydraulic devices, the range signals being indicative of a range of acceptable electric and hydraulic power levels associated with operation of the electric and hydraulic devices, and
wherein the supervisory control is configured to determine the control signals for controlling operation of the electric and hydraulic devices based on the operation signals, the range signals, and the request signals indicative of requested operation of the electric and hydraulic devices.

3. The system of claim 2, wherein the machine further includes an internal combustion engine and the subsystem controls include an engine subsystem control, and wherein the supervisory control is configured to determine control signals for controlling operation of the internal combustion engine based on the operation signals, the range signals, and the request signals indicative of requested operation of the electric and hydraulic devices.

4. The system of claim 3, wherein the electric device includes a motor/generator, and the hydraulic device includes a hydraulic pump/motor.

5. The system of claim 4, wherein the controller is configured to control supply of power to the internal combustion engine from at least one of the motor/generator and the hydraulic pump/motor, and wherein the controller is configured to control supply of mechanical power from the internal combustion engine to at least one of the motor/generator and the hydraulic pump/motor.

6. The system of claim 2, wherein the operation signals are indicative of an ability of the electric and hydraulic devices to either provide power or consume power upon receipt of the request signals by the controller.

7. The system of claim 2, wherein the range signals are indicative of maximum and minimum power levels at which the electric and hydraulic devices are permitted to operate upon receipt of the request signals by the controller.

8. The system of claim 7, further including an electric subsystem and a hydraulic subsystem, wherein the electric subsystem includes a plurality of electric devices and the hydraulic subsystem includes a plurality of hydraulic devices, wherein range signals associated with an electric device are based on either the electric device alone or on operation of the electric device within the electric subsystem, and wherein range signals associated with a hydraulic device are based on either the hydraulic device alone or on operation of the hydraulic device within the hydraulic subsystem.

9. The system of claim 2, wherein the electric device includes an electric storage device, and wherein the electric subsystem control is configured to provide request signals associated with the electric storage device.

10. The system of claim 2, wherein the hydraulic device includes an accumulator, and wherein the hydraulic subsystem control is configured to provide request signals associated with the accumulator.

11. The system of claim 2, wherein the range of acceptable electric and hydraulic power levels provides limits for the supervisory control.

12. The system of claim 2, wherein the electric device includes at least one of a motor/generator and an electric storage device.

13. The system of claim 12, wherein the electric device comprises a motor/generator configured to consume electric power received from the machine during acceleration and provide electric power to the machine during deceleration.

14. The system of claim 13, wherein controller is configured to control supply of electric power consumed by the motor/generator received from at least one of a battery, an ultra-capacitor, and a second motor/generator, and wherein the controller is configured to control electric power provided by the motor/generator to at least one of the battery for storage, the ultra-capacitor for storage, and the second motor/generator for assisting operation of the second motor/generator.

15. The system of claim 2, wherein the hydraulic device includes at least one of an accumulator, a hydraulic cylinder, and a hydraulic pump/motor.

16. The system of claim 15, wherein the controller is configured to control supply of hydraulic power consumed by the hydraulic pump/motor received from at least one of an accumulator, a hydraulic cylinder, and a second hydraulic pump/motor, and wherein the controller is configured to control hydraulic power provided by the pump/motor to at least one of the accumulator for storage, the hydraulic cylinder for assisting operation of the hydraulic cylinder, and the second hydraulic pump/motor for assisting operation of the second pump/motor.

17. A method for controlling power in a machine comprising an electric device configured to provide electric power and consume electric power, and a hydraulic device configured to provide hydraulic power and consume hydraulic power, the method comprising:
receiving, via a controller, request signals indicative of requested operation of the electric and hydraulic devices;
receiving, via the controller, operation signals from the electric and hydraulic devices, the operation signals being indicative of a status of the electric and hydraulic devices;
determining, via the controller, a level of power to be provided or consumed by the electric and hydraulic devices based on the request signals, the operation signals, and a control strategy for controlling electric and hydraulic power for the machine; and
providing, via the controller, control signals for controlling operation of the electric and hydraulic devices,
wherein the control strategy includes subsystem controls and a supervisory control,
wherein the subsystem controls include an electric subsystem control for controlling operation of the electric device and a hydraulic subsystem control for controlling operation of the hydraulic device,
wherein the subsystem controls are configured to provide range signals for the electric and hydraulic devices to the supervisory control, the range signals being indicative of a range of acceptable electric and hydraulic power levels associated with operation of the electric and hydraulic devices, and
wherein the supervisory control is configured to receive the range signals from the subsystem controls and determine the control signals for controlling operation of the electric and hydraulic devices based on the operation signals, the range signals, and the request signals indicative of requested operation of the electric and hydraulic devices.

18. The method of claim 17, wherein the machine further includes an internal combustion engine, and the method further includes determining control signals for controlling operation of the internal combustion engine based on the operation signals, the range signals, and the request signals indicative of requested operation of the electric and hydraulic devices.

19. The method of claim 18, wherein the electric device includes a motor/generator and the hydraulic device includes a hydraulic pump/motor, wherein the method further includes controlling supply of power to the internal combustion engine from at least one of the motor/generator and the hydraulic pump/motor, and wherein the method further includes controlling supply of mechanical power from the internal combustion engine to at least one of the motor/generator and the hydraulic pump/motor.

20. The method of claim 17, wherein the electric device includes a motor/generator configured to consume electric power received from the machine during acceleration and provide electric power to the machine during deceleration, wherein the method further includes controlling supply of electric power consumed by the motor/generator received from at least one of a battery, an ultra-capacitor, and a second motor/generator, and wherein the method further includes controlling electric power provided by the motor/generator to at least one of the battery for storage, the ultra-capacitor for storage, and the second motor/generator for assisting operation of the second motor/generator.

21. The method of claim 17, wherein the hydraulic device includes one of an accumulator, a hydraulic cylinder, and a hydraulic pump/motor, wherein the method further includes controlling supply of hydraulic power consumed by the hydraulic pump/motor received from at least one of an accumulator, a hydraulic cylinder, and a second hydraulic pump/motor, and wherein the method further includes controlling hydraulic power provided by the pump/motor to at least one of the accumulator for storage, the hydraulic cylinder for assisting operation of the hydraulic cylinder, and the second hydraulic pump/motor for assisting operation of the second hydraulic pump/motor.

22. A machine comprising:
a chassis;
an operator interface for controlling operation of the machine;
an electric device coupled to the chassis;
a hydraulic device coupled to the chassis; and
a controller configured to:
receive request signals indicative of requested operation of the electric and hydraulic devices;
receive operation signals from the electric and hydraulic devices, the operation signals being indicative of a status of the electric and hydraulic devices;
determine a level of power to be provided or consumed by the electric and hydraulic devices based on the request signals, the operation signals, and a control strategy for controlling electric and hydraulic power for the machine; and
provide control signals for controlling operation of the electric and hydraulic devices,
wherein the control strategy comprises subsystem controls and a supervisory control,
wherein the subsystem controls include an electric subsystem control for controlling operation of the electric device and a hydraulic subsystem control for controlling operation of the hydraulic device,
wherein the subsystem controls are configured to provide range signals for the electric and hydraulic devices to the supervisory control, the range signals being indicative of a range of acceptable electric and hydraulic power levels associated with operation of the electric and hydraulic devices, and
wherein the supervisory control is configured to receive the range signals from the subsystem controls and determine the control signals for controlling operation of the electric and hydraulic devices based on the operation signals, the range signals, and the request signals indicative of requested operation of the electric and hydraulic devices.

23. The machine of claim 22, wherein the machine further includes an internal combustion engine and the subsystem controls include an engine subsystem control, and wherein the supervisory control is configured to determine control signals for controlling operation of the internal combustion engine based on the operation signals, the range signals, and the request signals indicative of requested operation of the electric and hydraulic devices.

24. The machine of claim 23, wherein the electric device includes a motor/generator, and the hydraulic device includes a hydraulic pump/motor.

25. The machine of claim 24, wherein the controller is configured to control supply of power to the internal combustion engine from at least one of the motor/generator and the hydra pump/motor, and wherein the controller is configured to control supply of mechanical power from the internal combustion engine to at least one of the motor/generator and the hydraulic pump/motor.

26. The machine of claim 22, wherein the electric device includes at least one of a motor/generator, a battery, and an ultra-capacitor.

27. The machine of claim 22, wherein the hydraulic device includes at least one of a hydraulic pump/motor, a hydraulic cylinder, and an accumulator.

28. The machine of claim 22, wherein the machine further includes:
 a cab rotatably mounted on the chassis;
 a boom pivotally coupled to the cab;
 a stick pivotally coupled to the boom; and
 an implement pivotally coupled to the stick,
 wherein the electric device includes a motor/generator coupled to the cab and the chassis for rotating the cab with respect to the chassis,
 wherein the hydraulic device includes a plurality of hydraulic devices including:
 a first hydraulic cylinder coupled to the cab and the boom for pivotally moving the boom with respect to the cab,
 a second hydraulic cylinder coupled to the boom and the stick for pivotally moving the stick with respect to the boom, and
 a third hydraulic cylinder coupled to the stick and the implement for pivotally moving the implement with respect to the stick.

29. The machine of claim 28, wherein the controller is configured to:
 receive signals from the operator interface indicative of requested hydraulic operation of the first hydraulic cylinder, the second hydraulic cylinder, the third hydraulic cylinder, and the motor/generator;
 receive the operation signals from the motor/generator and the first, second, and third hydraulic cylinders;
 determine a level of power to be provided or consumed by the motor/generator and the first, second, and third hydraulic cylinders based on the request signals, the operation signals, and the control strategy; and
 provide control signals for controlling operation of the motor/generator and the first, second, and third hydraulic cylinders.

* * * * *